Feb. 28, 1961
B. B. S. T. BOONSTRA
2,972,780
PROCESS FOR EXTRUSION AND CONTINUOUS
CURE OF POLYMERIC COMPOSITIONS
Filed May 17, 1957
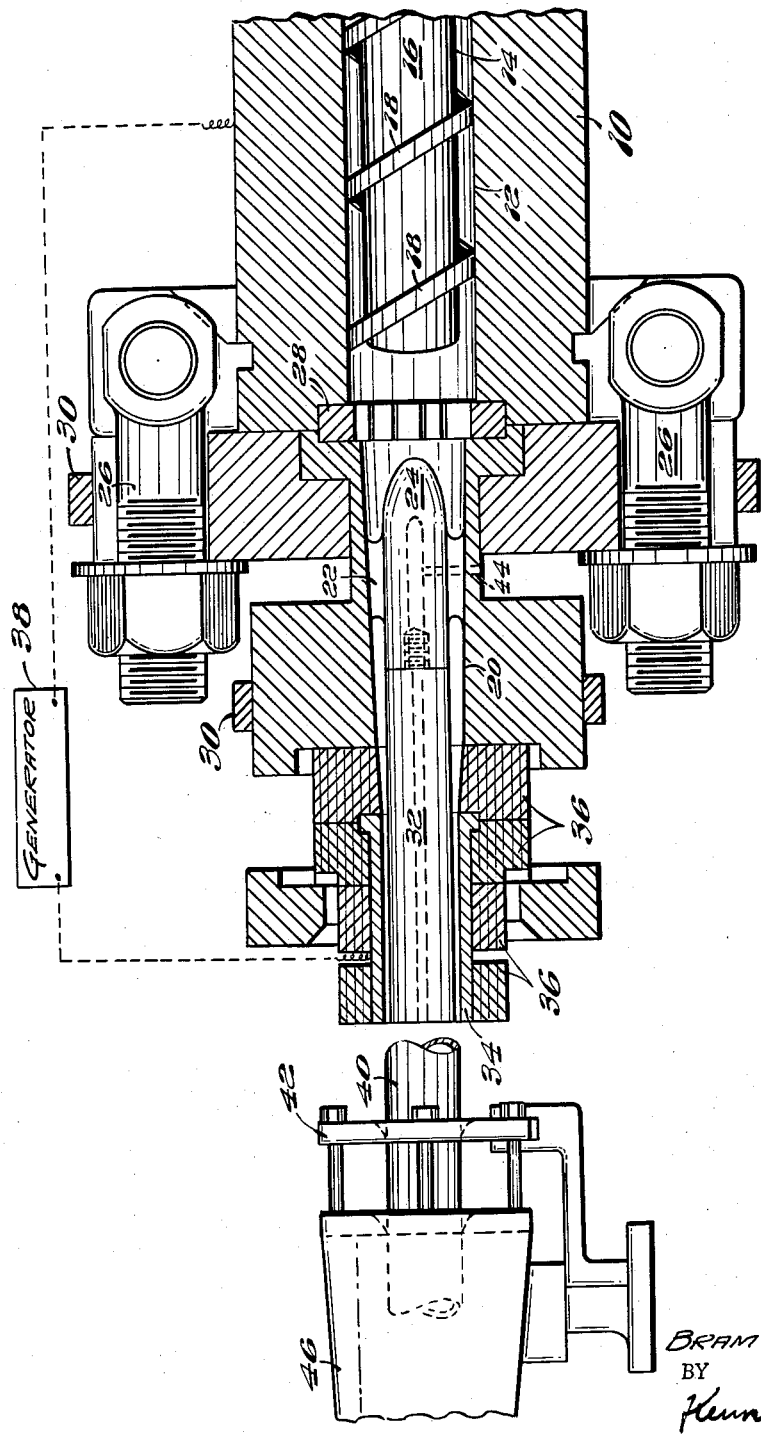
INVENTOR.
BRAM B. S. T. BOONSTRA
BY
Kenneth W. Brown, Atty United States Patent Office 2,972,780
Patented Feb. 28, 1961

2,972,780

PROCESS FOR EXTRUSION AND CONTINUOUS CURE OF POLYMERIC COMPOSITIONS

Bram B. S. T. Boonstra, Sharon, Mass., assignor to Cabot Corporation, Boston, Mass., a corporation of Delaware Filed May 17, 1957, Ser. No. 659,867

9 Claims. (Cl. 18—55)

This invention relates to methods for producing continuous lengths of shaped plastic material having good high temperature for stability from a heat-curable polymeric composition. It is particularly concerned with a process for continuously extruding and curing to the form-memorization state, while in the cross-sectional shape desired, heat curable polymeric compositions which can satisfactorily be cured or cross-linked only at temperatures above the no-strength or melting temperature thereof. The process of this invention is especially advantageous for the continuous production of articles of generally tubular cross-section such as pipe and conduit.

The continuous curing of heat-curable polymeric compositions quickly and continuously during extrusion of the desired cross sectional shape is a goal toward which the rubber and plastics industries have long been striving. However, continuous cure of this type thus far has not become a practical commercial reality except for certain small cross sectional shapes of low heat capacity. Thus, with conventional curing agents and heating systems, when the nature of the composition permits use of same, too great length of heating passage is required for practicable production rates. On the other hand, with more heat-sensitive curing agents and/or more rapid heating methods required for certain compositions, notably those with which this invention is concerned, sticking and scorching occurs in the extruder causing uneven or premature curing and the production of rough, unsightly extrusions full of defects, flaws and areas with inadequate strength and integrity.

One of the principal objects of this invention is to provide a simple, rapid and reliable method for continuously and simultaneously shaping, extruding and curing to the high temperature form-memorization state a heat-curable polymeric composition.

A further object is to provide such a process which is particularly advantageous for cross-linking heat-curable polymeric compositions which can be extruded readily at temperatuers below their active curing temperatures.

Another important object of this invention is to provide a method of continuously producing by means of extrusion a uniformly and thoroughly cross-linked yet smooth surfaced, form-stable generally tubular article from a thermoplastic, heat-curable polymer composition.

It is also an object of this invention to provide simple apparatus especially adapted for use in such a process.

Other objects accomplished by the process of this invention include the attainment of high production rates of cross-linked polymeric compositions, avoidance of complicated high cost equipment and elimination of separate curing steps and the extra handling associated with same, thereby minimizing unit production costs.

Still other objects and advantages will be apparent from the detailed description of our invention which follows.

The above objects and advantages are realized in accordance with the present invention by flowing a heat-curable polymeric composition heated to a temperature at which it is readily shapable and flowable but below its active curing temperature through a passage of desired cross section, raising the temperature of said composition quickly and uniformly to an active curing level during its travel through said passage, adjusting the flow rate of said composition through said passage in proportion to the temperature attained therein so that it emerges from said passage incompletely but sufficiently cured to have form stability, and then completing cure of the composition to the stable form-memorization state while it is not closely confined by solid surfaces. As an additional feature of this invention said composition may be further shaped during completion of the cure but before the final permanently stable form-memorization state is reached.

The feature of our invention which is most critical to the smooth continuous extrusion and cure of a rapidly heat-curable polymer is that of uniformly heating the entire cross-section of the material from the initial extrusion temperature to the active curing temperature while in the shaping passage of the extruder without overheating and causing sticking or roughening of that portion which is in contact with the boundary walls of said passage. We have found that an ideal means for achieving this rapid but uniform increase in temperature while the material is passing through the shaping passage is to impose uniformly across said passage a high frequency alternating electrical field of proper intensity, thereby generating heat energy within the flowing material itself due to the internal frictional effects caused by the molecular oscillations thus induced. This, of course, requires not only a source of high frequency current but the use of certain elements of auxiliary equipment which, however, are readily adapted for attachment to more or less conventional types of plastics extrusion equipment.

One specific embodiment of apparatus in which the process of the present invention may advantageously be carried out for the production of cross-linked pipe is illustrated in the accompanying drawing which is a somewhat schematic view thereof partly in cross-section.

As shown in the drawing, the illustrated apparatus includes an extruder with a body portion 10 of more or less conventional design equipped with a charging opening (not shown) for introducing the feed composition and with a relatively slow but safe (e.g. thermostatically controlled) system (not shown) of heating the feed material to the proper extrusion temperature (which, of course, is below the active curing temperature). Any easily controlled heating system (e.g. electrical heating or circulated oil heating) is adequate for this purpose. Concentrically located in the bore or barrel 12 of the extruder is the extruder worm or feed screw 14 with helical flights 18. Feed screw 14 is, of course, rotated within the bore 12 by conventional means (not shown).

The die or shaping section of the extruder consists of a tapered cylindrical section 20 in which is concentrically fixed by means of struts 22 a streamlined mandrel 24. The die assembly is fastened to the body of the extruder by outside clamping members 26 allowing the placement, if desired, of a screen 28 at the point where the bore 12 communicates with the die section 20. Depending upon the manner in which the extruder is designed, the main heating system is distributed and the conditions of operations, supplemental strip heaters 30 may be employed to compensate for heat losses and maintain temperatures in the die assembly.

For the practice of this invention shaping and curing units are advantageously provided as auxiliary extensions of the members of the die assembly described above. Thus, cylindrical member 32 is attached directly to mandrel 24 in axial alignment therewith, while sleeve 34 is positioned concentrically around the rod 32 and aligned with the downstream end of cylindrical section 20. These members 32 and 34 not only define the annular shaping passage through which the plastic material is extruded but also serve as the elements for heating the plastic material to its active curing temperature. In the preferred embodiment of this invention such heating is effected dielectrically in a high frequency alternating electrical field. Therefore, both of these members 32 and 34 are constructed of electrically conducting material and are insulated from one another by means of insulating spacer rings or sections 36, the thickness and dielectric strength of which is so great that, in operation, substantially the entire heating effect of the high frequency dielectric field imposed between the two electrodes 32 and 34 will be experienced by the plastic material which is flowing in the annular space between these two members. In order to permit the electrodes 32 and 34 to be energized for impression of the dielectric field upon the material flowing therebetween, leads from a suitable generator 38 of high frequency alternating current are attached as shown in the drawing, one directly to sleeve 34, the other to the body 10 of the extruder, thus making contact through struts 22 and mandrel 24 with extension rod 32.

In operation, the heat-curable polymer composition, the compounding of which will be described hereinafter, is introduced into the heated cavity of the extruder. Here it is heated by any controlled means to a satisfactory shaping and extrusion temperature which is well below its active curing temperature while being forced by feed screw 14 through the barrel 12 and around mandrel 24 through shaping die section 20. As the polymer compound flows through the annular passage between members 32 and 34, the high frequency dielectric field uniformly impressed therebetween excites the molecules or particles in accordance with the extent of their dipolar character. Since the frequency and strength of the field is uniform at all points within said passage, the amount of heating will be uniform at all points provided the material flowing is of uniform composition. For a given composition the extrusion rate and intensity of the dielectric field are adjusted so that the temperature of the composition is raised to the level where substantially complete curing will take place within a very few minutes, preferably within 1 minute. Since the heating is so fast and intense, the composition is actually subjected uniformly to active curing temperatures for a few seconds of the time it is flowing between the electrodes. Although only a minor amount of the total cross-linking may have been accomplished when the formed generally tubular article 40 emerges from the end of the auxiliary shaping section, it is sufficient to effect a very significant change in properties of the polymer composition and to provide form stability in the absence of any appreciable added load. Thereafter, the now self-supporting composition continues to cure from the residual heat contained therein. Although it will tend to lose heat to the surroundings, this loss can easily be minimized sufficiently that active curing temperatures can be maintained for the time required (usually about 0.5 to 2 minutes) to complete the cure to the permanently stable form memorization state.

Sometimes it may be desirable to effect precise adjustment of the dimensions of the article after extrusion and before completion of cure. This is preferably accomplished by applying slight pressure to the inside of the article while forcing it through a sizing orifice 42. If this final sizing step is used it must be carried out before the permanently stable form-memorization state has been reached. The desired pressure may be obtained by flowing air or other suitable gas into the interior of the article as it is being extruded through passage 44 leading to the hollow center of mandrel 24 which communicates directly with the passage inside member 32.

In a similar manner a solid core such as a wire can be continuously passed through the center of the extrusion passage and with minor modifications the polymer composition of this invention can be continuously extruded as a covering upon said wire (either bare or insulated).

Although cooling of the finally shaped article can be accomplished by ordinary radiation and convection to whatever surroundings are available, in order to save working space it will usually be desirable to remove the last portion of residual heat by contact with liquid coolant. For example, the extruded article may be passed through a water spray or through a water bath 46, before being reeled up or otherwise removed as finished product for storage or shipping.

The above process has been applied with particular success to the continuous production of articles of tubular shape from filled polymer compositions containing organic peroxides and other organic compounds which decompose under the influence of heat to form free radicals. The advantages of this method of operation are especially welcome in handling such compositions in which the temperatures required for active highspeed curing or cross-linking are above 300° F., e.g. 325° to 500° F., while the minimum extrusion temperature is below 300° F. and preferably at least 50 to 100° F. below the active high-speed curing temperatures. For example, the various grades of polyethylene, blends of polyethylene with other polymers, or other polymers derived principally from simple monoolefins are all thermoplastic and can be extruded at temperatures as low as 230 to 300° F. Likewise it has been shown that such polymers can be cross-linked readily by certain compounds, such as organic peroxides, which actively decompose into free radicals, at temperatures above 300° F. For example, Rossman and Dannenberg in U.S. application Ser. No. 637,634, filed February 1, 1957, describe such compositions that can be substantially completely cross-linked in a minute or less at temperatures in the range of 300 to 400° F.

In order to obtain uniform rapid heating by dielectric means it is extremely important that the compositions used in the present invention be filled with a highly conductive filler. Because of their fine particle size and highly reinforcing nature, carbon blacks are particularly desirable. Certain metal oxides, e.g. iron oxides, or finely powdered metals can also be used, but especially good results have been obtained with those compositions containing at least about 30 parts by weight carbon black per 100 parts of resin.

Some of the preferred types of compositions and methods of compounding same are illustrated by the following specific examples.

*Example 1*

Into 100 parts of low pressure type linear polyethylene (0.96 density), there is thoroughly milled 50 parts by weight of medium thermal type carbon black and about 2 parts by weight of technical grade dicumyl peroxide. Some care must be observed not to conduct this milling and dispersing operation at an excessively high speed so as to limit the temperature of the entire milling operation to a level below about 275° F., i.e. well below the active decomposition temperature of the dicumyl peroxide.

*Example 2*

Into 100 parts of high pressure type low density polyethylene (0.92 density), there is thoroughly milled 60 parts by weight of acetylene black and about 2 parts by weight of tertiary butyl perbenzoate, the entire milling operation being conducted at temperatures of below about 250° F., which is well below the active decomposition temperature of the teritary butyl perbenzoate.

The remaining examples will be devoted to the illustration of typical methods of conducting the process of this invention with particular reference to the use of the apparatus shown in the accompanying drawing.

Example 3

A base compound was prepared by thoroughly mixing together as a single charge in a Banbury mixer the following ingredients:

| | Parts |
|---|---|
| Low density polyethylene | 100 |
| Medium thermal carbon black | 100 |
| Dimethyl silicone fluid | 2.5 |

The resulting homogeneously mixed base compound was then banded on a roll mill and, taking care to avoid temperatures above about 260° F., 1.7 parts by weight of dicumyl peroxide were incorporated uniformly therein. The resulting finished compound was then charged to an extruder the main bore or barrel 12 of which was about 1½" in diameter. The temperature of the body of the extruder and of the material therein up to the point where it enters the annular passage between electrode members 32 and 34 was maintained at about 275° F. by means of thermostatically controlled electrical resistance heaters.

After steady flow of the finished compound had been established through the said annular passage, a dielectric field of approximately 300 volts potential was imposed across said passage by energizing the 27 megacycle per second generator 38 connected to electrodes 32 and 34. In this case the outside diameter of 32 was 0.824" and the inside diameter of 34 was 1.05 inches, both measurements including a thin surface coating of baked on Teflon. With the rotational speed of the feed screw 14 set to move the compound through the said annular passage at a rate of between 1.5 and 2 ft. per minute, the shaped compound emerging from said passage with the dielectric field energized had increased in temperature to about 400° F. and had good form stability, whereas before the dielectric field was activated it emerged at about 260 to 275° F. and without sufficient form stability to retain its extruded shape with or without slight internal air pressure provided through line 44.

With the dielectric field continuously applied, the shaped material exiting from the annular passage was characterized by exceptionally smooth, glossy surfaces both inside and out and maintained a uniform cylindrical shape of slightly larger outside diameter than the 1.05 inch inside diameter of outer shaping electrode 34 until it reached the final sizing ring 42 spaced about 1 foot from the exit of the said annular passage. The temperature of the pipe-formed composition at the sizing ring had dropped to about 375° F., which is still in the very active curing range for this compound. After this temperature had dropped below about 320° F. or below the really active curing range, final cooling could be accomplished immediately and as rapidly as desired by passing the pipe through cold water bath 46.

The finished pipe is flexible enough to be coiled and handled like ordinary flexible plastic piping although it is markedly superior, having all of the advantages of cross-linked material including greatly increased strength particularly at elevated temperature, increased resistance to hydrocarbon solvents, and improved long time aging and fatigue resistance, particularly resistance to embrittlement and/or stress corrosion cracking (e.g. in surface active solutions).

In the above example, the extrusion rate and production rate of the pipe can be greatly increased without affecting the desirable properties of the finished product by increasing any or all of the following factors: (1) length of the annular passage across which the dielectric field is applied, (2) the frequency of the current from the dielectric generator and (3) the voltage potential of the dielectric field which is applied across the annular passage.

Example 4

The following compound was mixed by adding all the ingredients as a single charge to a Banbury mixer and masticating the charge until a uniformly dispersed composition is obtained while taking care to avoid temperatures above about 260° F.

| | Parts |
|---|---|
| Low density polyethylene | 100 |
| Medium thermal carbon black | 100 |
| Dimethyl silicone fluid | 2 |
| Dicumyl peroxide | 1.7 |

The resulting compound was then extruded under substantially the same conditions and, with the same apparatus described in Example 3, was converted into cross-linked pipe continuously at a rate of about 2 ft. per minute. The bursting pressure of the resulting pipe at any given temperature was more than double that of standard commercially available plastic pipe made from low density polyethylene. Also the no-strength temperature of the resulting pipe was above 300° F. while ordinary low density polyethylene pipe has a no-strength temperature of about 200° F.

Substantially the same results can be obtained by using in the above example, a homogeneously mixed compound made according to the following recipe:

| | Parts |
|---|---|
| Low density polyethylene | 100 |
| Medium thermal carbon black | 50 |
| SRF carbon black | 50 |
| Chlorinated diphenyl lubricants | 2 |
| Dicumyl peroxide | 1.7 |

Various substitutions can be made in the components of the compounds described above and in the extrusion and curing equipment used without significantly affecting the results achievable through the practice of this invention.

For example, various other ethenic resins from among the wide spectrum of such resins now known and becoming commercially available can also be used, including those commonly referred to as "high density," "low-pressure" or linear polyethylenes, and those referred to as "intermediate density" polyethylenes.

Also any filler loading can be used which will provide rapid dielectric heating of the uniformly mixed stock. For example, 50 parts loading of acetylene black, or extra or super conductive furnace blacks can be used provided they are thoroughly dispersed throughout the compound.

In place of the silicone or chlorinated hydrocarbon lubricants mentioned above, any other lubricating fluids with reasonably good high temperature stability can be used, including alkyl diesters such as 2-ethyl hexyl sebacate, triesters and other complex esters such as alkyl, aryl, or mixed alkyl and aryl phosphates, diphosphates, phosphonates, etc., liquid polymers of alkylene glycols, epoxides and other liquid polymers which are reasonably compatible with the compound in question.

Finally, in place of the dicumyl peroxide curing agent there can be used any other organic peroxide or free-radical generating organic compound which is not excessively volatile or unstable at the minimum milling temperature required for uniform mixing of the compound and which decomposes actively into free radicals at temperatures at which the main polymer component of the compound is not damaged or degraded significantly during the short curing time required in the present process.

Although the baked Teflon lining used on the shaping surfaces of the electrode members in the above examples is not absolutely necessary, it offers insurance against arcing troubles which may develop at any sharp corners or rough surfaces of a metal surface and also tends to improve the smoothness of the surfaces of the tubular product extruded from the polymeric composition. Any other coating material which provides a surface with coefficient of friction comparable to or better than polished metal and which has significantly lower dielectric constant than that of the polymer compound to be extruded and which does not soften appreciably at the active curing temperatures required by said compound can also be used. Teflon, a polymer of tetrafluorethylene and other polymers of halogen substituted monoolefins appear to be ideal.

Instead of the 27 megacycles per second dielectric generator used in the above example, there may be used any other high frequency source capable of at least about 2 megacycles per second. However, frequencies between about 10 and about 200 megacycles are preferred.

Having described my invention and preferred embodiments thereof, what I claim and desire to secure by U.S. Letters Patent is:

1. A fully continuous process for producing a finished cured article of uniform cross-sectional shape and continuously extended length from a heat-curable polymeric composition which, at temperatures below the minimum temperature required for active curing thereof, softens to the point of being formless per se and readily shapable, comprising heating said composition to a temperature at which it is shapable but not curable, causing it to flow into a uniform passage of substantially the cross-sectional shape desired in the finished article while maintaining the said composition below its active curing temperatures, then quickly introducing additional heat into said composition as it is flowing through said passage so as to raise its temperature to a temperature above the minimum temperature required for active curing thereof, the time-temperature relationship of said heating in said passage being such that a minor but form-stabilizing portion of the total cure obtainable in said composition has been accomplished when it emerges from said passage, and then completing cure of the thus shaped and form-set composition while it is not closely confined by contacting surfaces.

2. The process of claim 1 in which the additional heat quickly introduced into the composition while it is flowing through the said uniform passage is provided by applying a high frequency dielectric field across the said passage.

3. The process of claim 2 in which the dielectric field applied has a frequency of at least about 2 megacycles per second.

4. A process for continuously extruding and curing to a high-temperature, form-stable state an elongated tubular article of uniform cross-sectional shape from a heat-curable polymeric composition which must be heated well above the no-strength temperature of the polymeric component thereof in order to become cured in a reasonable time which comprises heating said heat-curable polymeric composition to at least its softening temperature but below the temperature required for practical, high-speed curing, flowing the thus softened composition into an annular passage having a uniform cross-sectional shape approximately of the dimensions desired in the finished article, uniformly impressing across said annular passage a high-frequency dielectric field, thereby raising the temperature of the composition quickly and uniformly to a practical, high-speed curing temperature such that it is cured to a minor extent but sufficiently to be self-supporting upon emerging from said passage, and completing the cure of the thus extruded, form-set article predominantly while it is not closely confined by contacting surfaces.

5. The process of claim 4 wherein the final dimensions of the extruded temporarily form-set article are adjusted to the exact values ultimately desired by forcing it while under internal pressure through an external sizing orifice just before sufficient curing has taken plane to establish a permanently-stable, high-temperature form-memorization configuration.

6. The process of claim 4 in which the dielectric field impressed is characterized by a frequency of between about 2 and about 200 megacycles per second.

7. A fully continuous process for making heat-cured, high-temperature form-stable pipe or tubing of high quality from a polymeric composition completely lacking form-stability at the temperatures required to effect cure in a practical time comprising steadily extruding at a temperature below the active curing temperature thereof a composition which comprises a thermoplastic polymer of simple monoolefin monomers, a finely divided, conductive filler and an organic curing agent which functions only at a temperature well above the no-strength temperature of said polymer into a die of appropriate dimensions to impart the shape desired in the pipe or tubing emerging therefrom, rapidly treating said composition while flowing through said die to the active, high-speed curing temperature thereof, thereby effecting incipient cure and imparting temporary form stability to the pipe or tubing emerging therefrom, and completing cure of the said pipe or tubing to the finished high-temperature, form-stable, shape-memorization state while away from closely contacting and confining surfaces.

8. The process of claim 7 in which the finely divided, conductive filler is carbon black.

9. The process of claim 7 in which the said composition contains as the conductive filler at least 30 parts by weight of carbon black per 100 parts by weight of polymer.

References Cited in the file of this patent

UNITED STATES PATENTS

| Re. 23,948 | Fuller | Feb. 15, 1955 |
| 1,370,800 | Egerton | Mar. 8, 1921 |
| 2,403,476 | Berry et al. | July 9, 1946 |
| 2,436,999 | MacMillin et al. | Mar. 2, 1948 |
| 2,443,594 | Boettler et al. | June 22, 1948 |
| 2,528,523 | Kent | Nov. 7, 1950 |
| 2,583,329 | Eckert | Jan. 22, 1952 |
| 2,697,157 | Kersta | Dec. 14, 1954 |
| 2,702,408 | Hartland | Feb. 22, 1955 |
| 2,747,224 | Koch et al. | May 29, 1956 |
| 2,782,180 | Weidman | Feb. 19, 1957 |